United States Patent
Tsai

(12) 
(10) Patent No.: US 7,195,255 B1
(45) Date of Patent: Mar. 27, 2007

(54) HANDLE POSITIONING DEVICE FOR A HAND TRUCK

(76) Inventor: Haiming Tsai, P.O. Box 6-9, Tainan (TW)

( * ) Notice: Subject to any disclaimer, the term of this patent is extended or adjusted under 35 U.S.C. 154(b) by 0 days.

(21) Appl. No.: 11/525,421

(22) Filed: Sep. 25, 2006

(30) Foreign Application Priority Data

Nov. 28, 2005 (TW) .............................. 94220672 U

(51) Int. Cl.
*B62B 1/04* (2006.01)
(52) U.S. Cl. ............... 280/47.29; 280/655; 280/47.315
(58) Field of Classification Search ............ 280/47.29, 280/47.27, 47.28, 47.24, 47.18, 30, 43.1, 280/43.11, 43.131, 47.15, 47.17, 47.2, 47.21, 280/47.23, 47.26, 47.315, 47.36, 47.371, 280/655, 654, 655.1
See application file for complete search history.

(56) References Cited

U.S. PATENT DOCUMENTS

| | | | | |
|---|---|---|---|---|
| 4,009,891 A * | 3/1977 | Jensen | ........................ | 280/651 |
| 4,185,848 A * | 1/1980 | Holtz | ......................... | 280/652 |
| 4,784,405 A * | 11/1988 | Stein | ........................ | 280/655 |
| 4,974,871 A * | 12/1990 | Mao | ........................... | 280/651 |
| 5,002,304 A * | 3/1991 | Carrigan, Jr. | ............... | 280/655 |
| 5,127,662 A * | 7/1992 | Spak | .......................... | 280/40 |
| 5,228,716 A * | 7/1993 | Dahl | ......................... | 280/651 |
| 5,348,325 A * | 9/1994 | Abrams | ...................... | 280/40 |
| 5,476,282 A * | 12/1995 | Dahl | ......................... | 280/651 |
| 5,803,471 A * | 9/1998 | DeMars et al. | ............... | 280/40 |
| 6,047,442 A * | 4/2000 | Workman | .................. | 16/113.1 |
| 6,053,514 A * | 4/2000 | Su | ............................. | 280/40 |
| 6,364,328 B1 * | 4/2002 | Stahler, Sr. | ............. | 280/47.18 |
| 6,454,293 B1 * | 9/2002 | Anderson | ................... | 280/651 |
| 6,616,174 B2 * | 9/2003 | Bierma | ....................... | 280/655 |
| RE38,436 E * | 2/2004 | Su | ............................. | 280/40 |
| 6,938,905 B1 * | 9/2005 | Tsai | ....................... | 280/47.29 |

* cited by examiner

Primary Examiner—J. Allen Shriver

(57) ABSTRACT

A handle positioning device for a hand truck includes a lateral rod, a pull rod, and a handle. The lateral rod has a slide groove respectively formed lengthwise in two end portions, and the pull rod has two bent ends fitting movably in the two slide grooves of the lateral rod. The handle has two side vertical rods, which fit respectively in the two ends of the lateral rod and provided with a plurality of position holes. When the handle is needed to be adjusted in its height, the pull rod is pushed to force the two ends to move inward to each other elastically in the two slide grooves of the lateral rod, and then the handle can be adjusted in its height by moved up or down, and then the pull rod is released to fit elastically in a new position hole in two side rods of the handle to keep immovable the handle at the newly adjusted height.

1 Claim, 5 Drawing Sheets

HANDLE POSITIONING DEVICE FOR A HAND TRUCK

BACKGROUND OF THE INVENTION

1. Field of the Invention

This invention relates to a handle positioning device for a hand truck, particularly to one for positioning the handle after moved up or down by pushing a pull rod installed on a lateral rod of a hand truck.

2. Description of the Prior Art

There is a case of a hand truck disclosed in a Taiwan patent of No. M266209 (published), which also acquired a U.S. Pat. No. 6,938,905 (a first enclosed document). But this case has an adjusting way for a handle by a stop bar 2210, a spring 2211 and two rings 2212, which is not so structured ideal.

SUMMARY OF THE INVENTION

The purpose of the invention is to offer a handle positioning device for a hand truck, which is easy to operate.

The feature of the invention is a slide groove provided in two end portions of a lateral rod of a hand truck, and a U-shaped pull rod having two side ends fitting movably in the slide grooves and further fitting in one of the position holes of two side rods of the handle.

BRIEF DESCRIPTION OF DRAWINGS

This invention will be better understood by referring to the accompanying drawings, wherein.

Enclosed document:
1. A copy of a U.S. Pat. No. 6,938,905.
2. A copy of a Taiwan patent No. M266209 (published).

DETAILED DESCRIPTION OF THE PREFERRED EMBODIMENT

Figure 1:
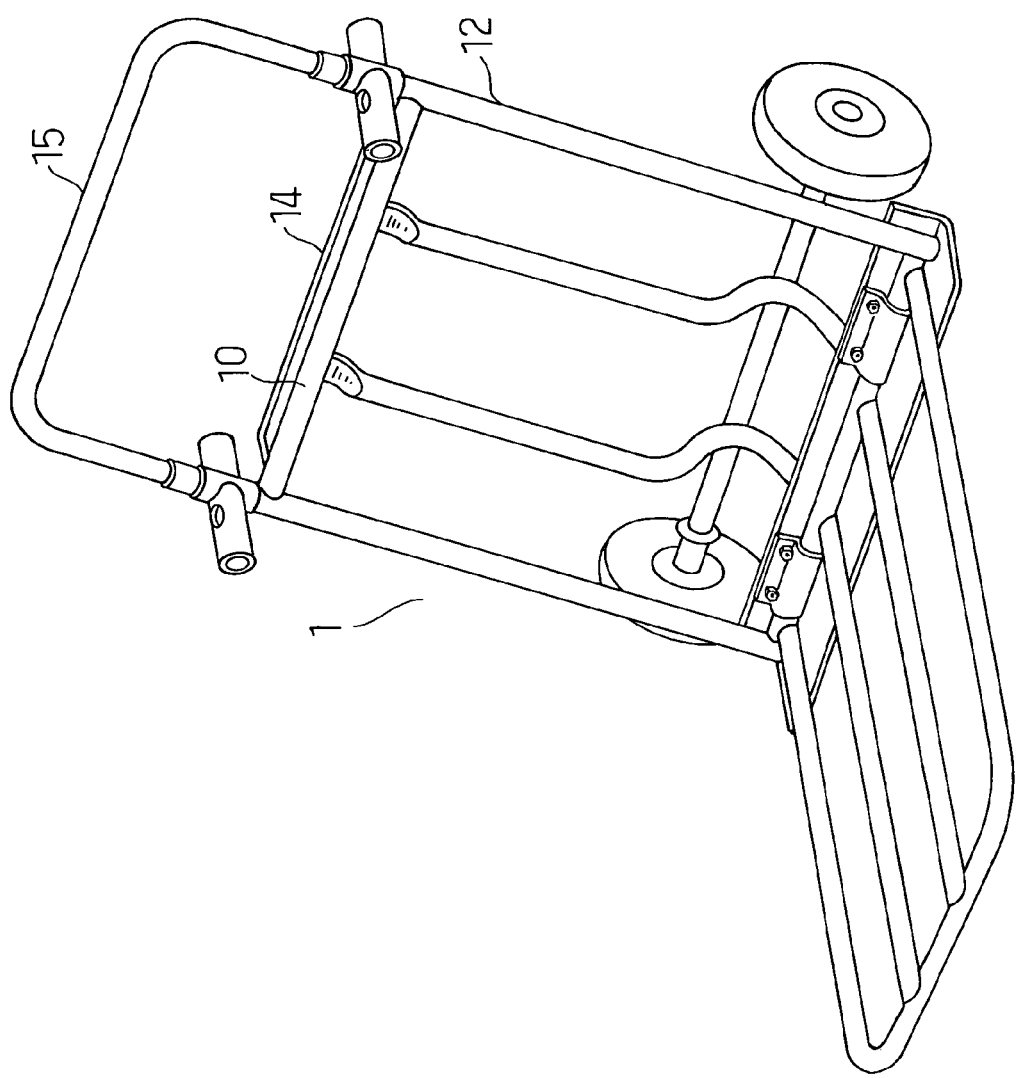
FIG. 1 is a perspective view of a hand truck provided with a handle positioning device in the present invention.
Figure 2:
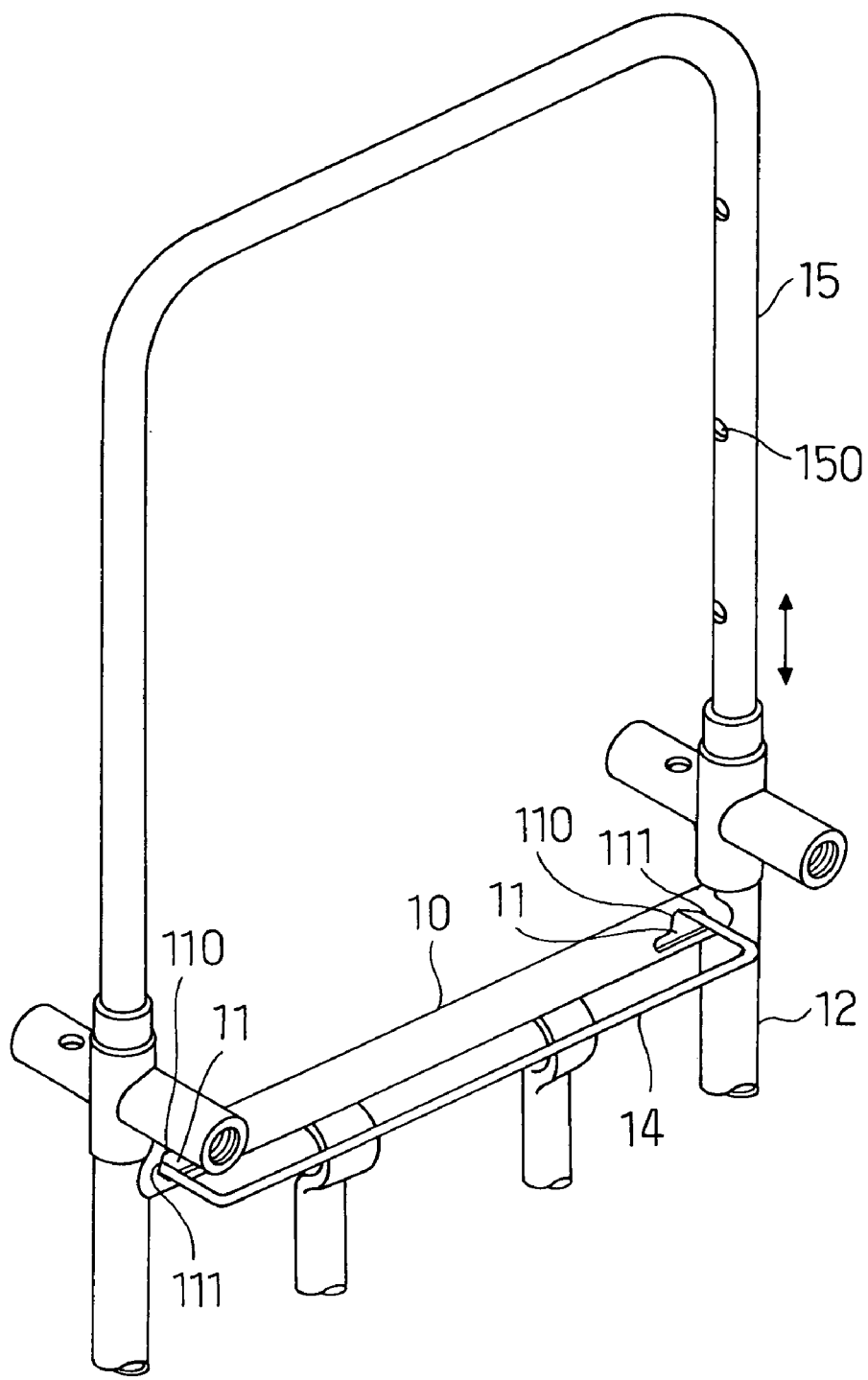
FIG. 2 is a perspective view of a handle of a hand truck in the present invention, showing the handle being moved up or down.
Figure 3:
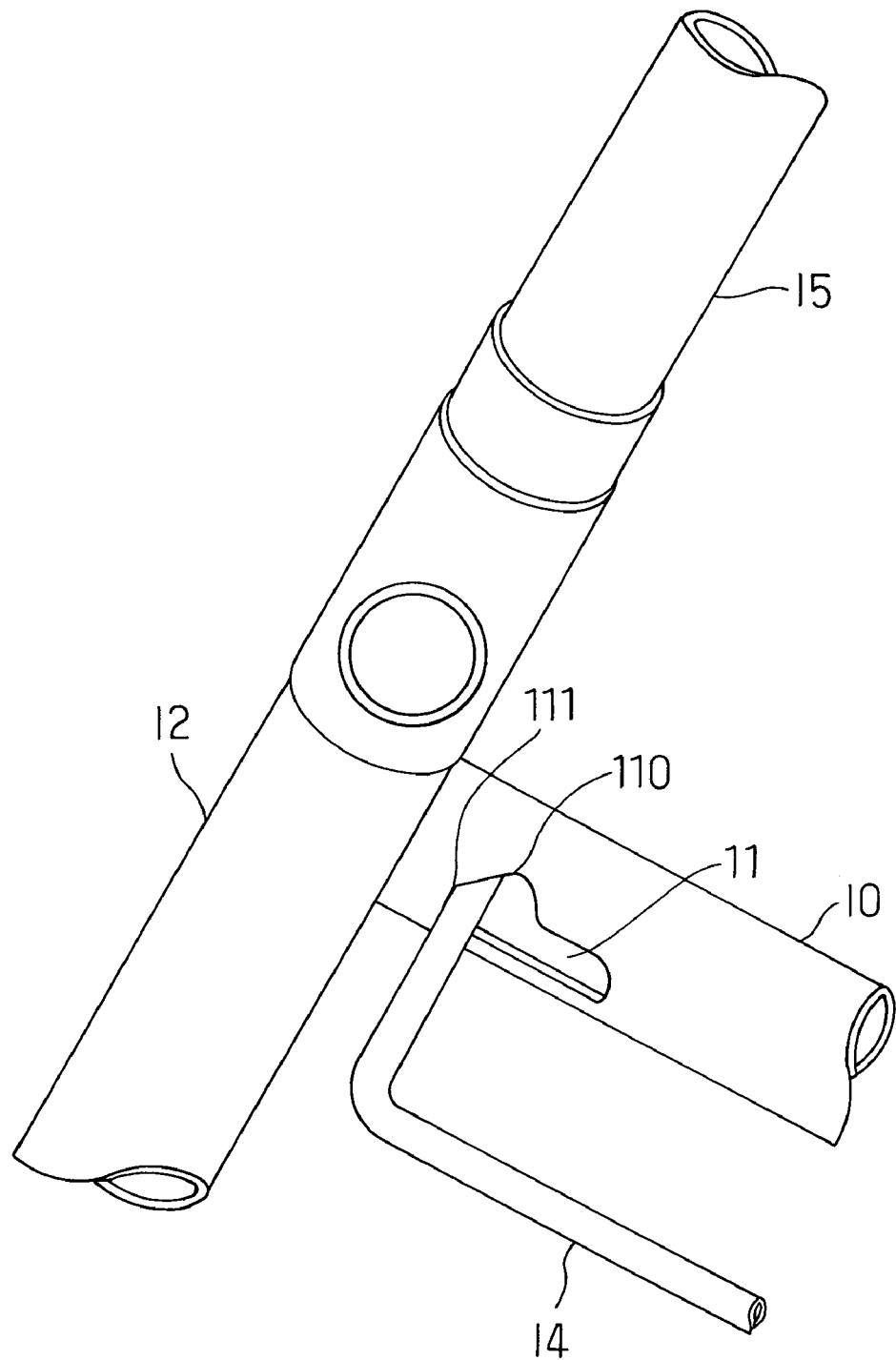
FIG. 3 is a partial perspective view of a pull rod in the present invention.
Figure 4:
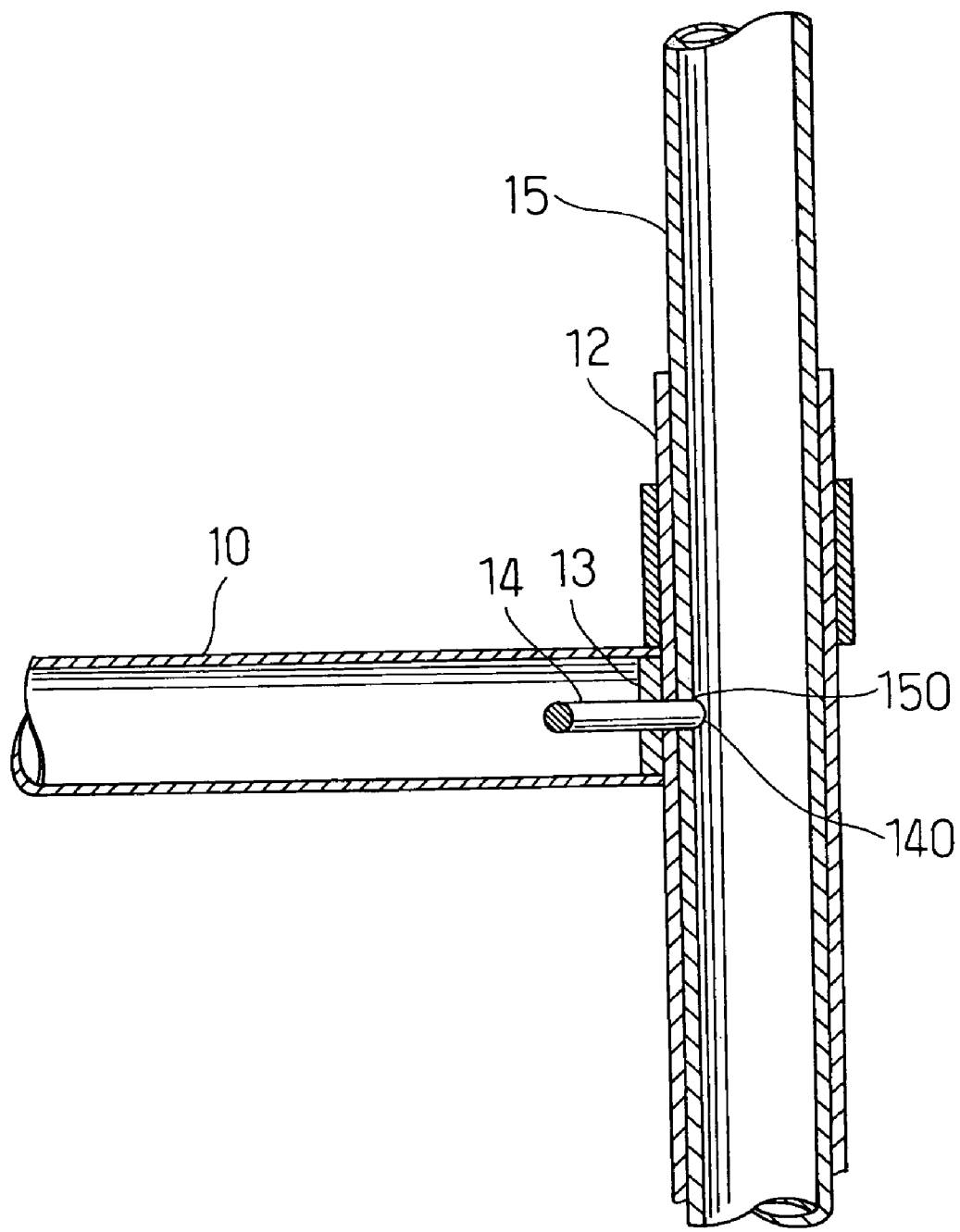
FIG. 4 is a cross-sectional view of the pull rod and the related parts in the present invention.
Figure 5:
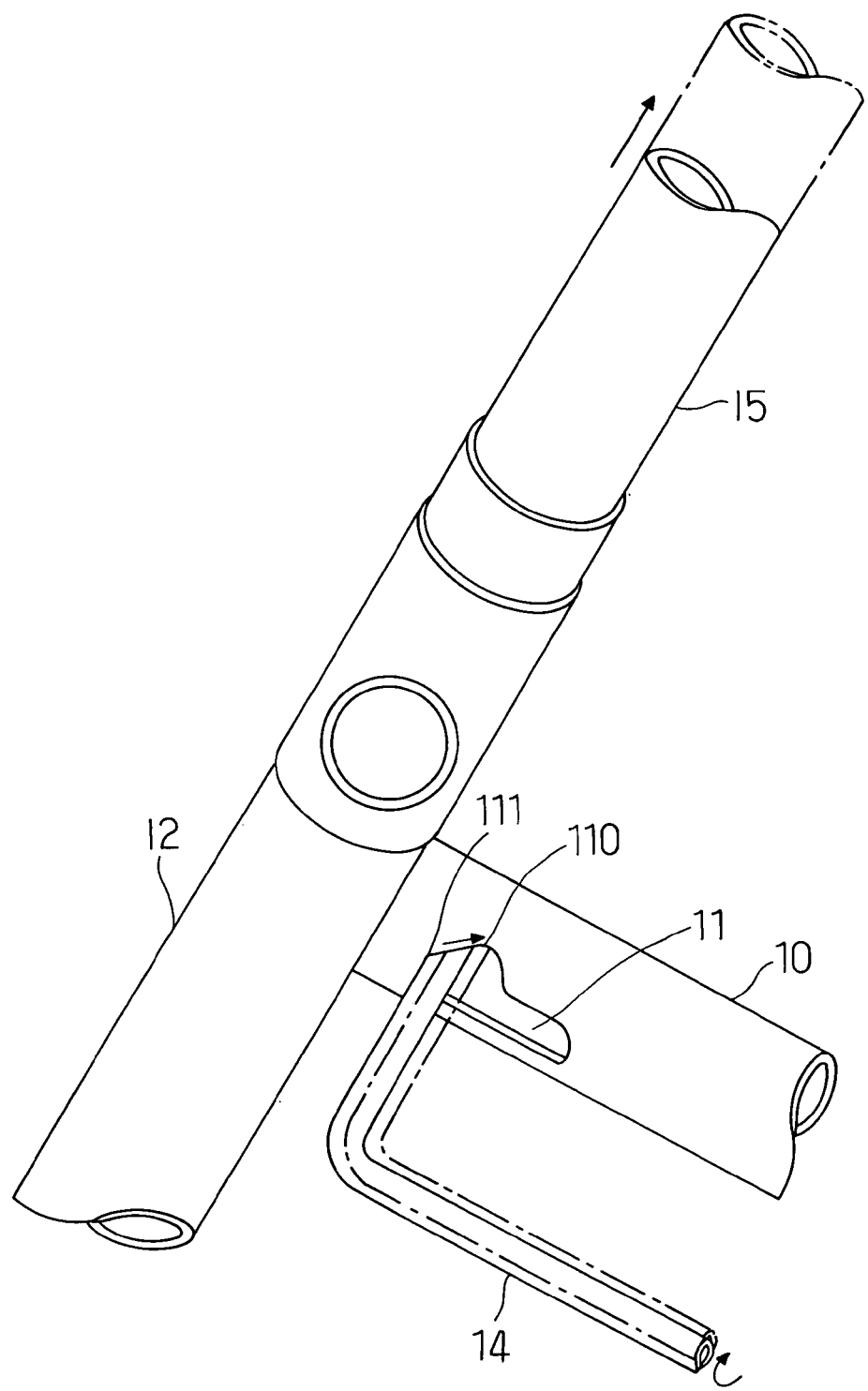
FIG. 5 is a perspective view of the pull rod positioned stably by fitting in a position face of a slide groove of a lateral rod in the present invention.

A preferred embodiment of a handle positioning device for a hand truck in the present invention, as shown in FIGS. 1–5, includes a lateral rod 10, a frame rod 12, a positioning ring 13, a pull rod 14, and a handle 15.

The lateral rod 10 is provided with a slide groove 11 formed lengthwise and respectively at two end portions. The slide groove 11 is provided with a recessed face 110 and a positioning face 111.

The two frame side rods 12 are vertically combined with the two ends of the lateral rod 10 respectively.

The positioning ring 13 is respectively fitted in the two ends of the lateral rod 10 at the connecting point of the two frame side rods 12 with the lateral rod 10.

The pull rod 14 is shaped as U, having two parallel bent ends fitting in the slide grooves 11 of the lateral rod 10, and further passing through the center hole of the positioning ring 13 located at the two ends of the lateral rod 10 and then fitting in one of plural positioning holes 150 two side rods of the handle 15. The pull rod 14 further has two engage ends 140 to fit in the positioning hole 150 of the handle 15 to keep stably and immovably the handle 15.

In using, if the handle 15 at a certain height of a hand truck is to be adjusted to an upper or a lower position relative to the lateral rod 10, the two ends of the pull rod 14 are pushed inward in the slide grooves 11 of the lateral rod 10, and then the engage ends 140 of the pull rod 14 will be moved inward from the position faces 111 to the recessed faces 110, separating from one of the positioning holes 150 of the two side rods of the handle 15. At this time, the handle 15 can be moved up or down in its position. After the handle 15 is adjusted to a desired height, the pull rod 14 is released to move back to the positioning faces 111 owing to its own resilience, with the engage ends 140 fitting back in the positioning holes 150 of the handle 15 so that the handle 15 is positioned stably immovable at that adjusted height.

The invention has the following advantages, as can be seen from the foresaid description.

1. The shifting from the recessed face 110 to the positioning face 111 or vice versa in the slide grooves 11 of the pull rod 14 is affordable owing to the resilience of the pull rod 14, very safe and simple.
2. The pull rod 14 of the handle positioning device in the invention effectively takes place of the stop bar 2210, the spring 2211 and the two rings 2212 in the U.S. Pat. No. 6,938,905 B1 mentioned above, reducing the material cost and manufacturing cost needed.
3. The handle positioning device in the present invention has a simple structure, convenient for assembly and repair.

While the preferred embodiment of the invention has been described above, it will be recognized and understood that various modifications may be made therein and the appended claims are intended to cover all such modifications that may fall within the spirit and scope of the invention.

What is claimed is:

1. A handle positioning device for a hand truck, said device comprising:

a slide groove formed lengthwise respectively in two end portions of a lateral rod of a hand truck, said slide groove provided with a recessed face and a position face;

a pull rod shaped as U, having two side ends respectively fitting movably in said slide grooves of said lateral rod and further in one of position holes formed spaced apart in two side rods of a U-shaped handle of said hand truck;

a position ring respectively fitted around a connecting point of said lateral rod and two side rods of a frame of said hand truck;

said handle having two side rods respectively provided with a plurality of positioned holes properly spaced apart for said two ends of said pull rod to selectably fit therein; and said pull rod normally having said two ends fitting in said position faces of said slide grooves of said lateral rod and further fitting in one of said positioned holes of said two side rods of said handle to keep immovable said handle at a height, said pull rod having some elasticity to be pushed to shrink inward to have said two ends moved inward from said position faces to said recessed faces of said slide grooves of said lateral rod and separated from one of said positioned holes of said two side rods of said handle so that said handle can be moved up and down to be adjusted in its height relative to the lateral rod, then said pull rod released to move back to said position faces of said slide grooves of said lateral rod to keep said handle immovable at the new adjusted height.

* * * * *